United States Patent [19]

Henton et al.

[11] Patent Number: 5,089,557

[45] Date of Patent: Feb. 18, 1992

[54] RUBBER MODIFIED BLEND OF NYLON AND STYRENE/ACRYLONITRILE MALEIC ANHYDRIDE TERPOLYMER

[75] Inventors: David E. Henton; Michael N. Mang, both of Midland, Mich.

[73] Assignee: The Dow Chemical Company, Midland, Mich.

[21] Appl. No.: 670,454

[22] Filed: Mar. 11, 1991

Related U.S. Application Data

[63] Continuation of Ser. No. 492,047, Mar. 12, 1990, abandoned.

[51] Int. Cl.$^5$ .............................................. C08L 77/00
[52] U.S. Cl. ...................................... 525/66; 525/179
[58] Field of Search ................................. 525/66, 179

[56] References Cited

U.S. PATENT DOCUMENTS 4,777,211  10/1988  Lavengood et al. ................. 525/66

Primary Examiner—Ana L. Carrillo

[57] ABSTRACT

Polymeric blends of a styrene/acrylonitrile grafted elastomer, nylon, a compatibilizer resin particularly styrene/acrylonitrile/maleic anhydride copolymer, and a core/shell grafted elastomer having an acid functionalized shell have greatly improved notch sensitivity.

9 Claims, No Drawings

RUBBER MODIFIED BLEND OF NYLON AND STYRENE/ACRYLONITRILE MALEIC ANHYDRIDE TERPOLYMER

CROSS-REFERENCE TO RELATED APPLICATION

This is a continuation of application Ser. No. 492,047, filed Mar. 12, 1990, now abandoned.

BACKGROUND OF THE INVENTION

This invention relates to thermoplastic polyamide (nylon) compositions and more particularly to polyamide compositions having improved impact resistance.

Unmodified thermoplastic polyamides are generally regarded as having good elongation and good resistance to breakage as demonstrated in tensile tests and high impact strength and high energy absorption as demonstrated in a falling dart test, e.g., the Gardner impact test. However, the polyamides are quite deficient in resistance to crack propagation. This deficiency is reflected in notch sensitivity, brittle breaks and occasional catastrophic failure of molded extruded parts. The tendency of polyamides to break in a brittle rather than a ductile fashion is a significant limitation of their end use applications.

A variety of additives have been added to polyamides with some improvement in toughness being obtained. In U.S. Pat. No. 4,713,415 blends of nylon, a grafted rubber composition and a functionalized resin containing carboxylic acid, ester or anhydride groups are disclosed. These resins possess some improvement in toughness, particularly notch sensitivity, however, the resins often become crosslinked under use conditions and demonstrate reduced melt flow thereby limiting their usefulness. In addition even greater toughness would be desired particularly at low temperature, as measured for example by notched Izod impact resistance at $-20°$ F. ($-29°$ C.).

In U.S. Pat. No. 4,086,300 a core/shell grafted elastomer for modification of polyamide polymers was disclosed comprising a crosslinked acrylate rubber core and a final rigid phase containing an amine reactive carboxylic acid group.

Although prior artisans have disclosed a large number of suitable rubbery modifiers for polyamides it would be desirable to employ readily available, relatively inexpensive grafted rubbers, particularly emulsion grafted ABS rubbers. Typically such emulsion grafted ABS rubbers comprise a core elastomeric polymer such as polybutadiene or an elastomeric butadiene/styrene copolymer. Grafted to the core is a graft copolymer of a vinylaromatic monomer and acrylonitrile. Such grafted ABS rubbers are well known and commercially available. Attempts to utilize the foregoing grafted ABS rubbers in blends of nylon and styrene/maleic anhydride copolymers are not generally successful. Typically the resulting blend shows little or no improvement in notched Izod impact strength, especially at reduced temperatures.

It would be desirable if there were provided an improved blend of a polyamide (nylon) resin and grafted ABS rubber having improved resistance to crack propagation as evidenced by good notched Izod impact resistance.

SUMMARY OF THE INVENTION

The present invention provides a polymeric composition and molded or extruded parts prepared from the composition comprising a blend of components:

(A) 5 to 60 weight percent of a graft rubber composition comprising a copolymer of from 90 to 70 parts by weight of a vinylaromatic monomer and from 10 to 30 parts by weight of acrylonitrile, wherein the monomers are polymerized in the presence of and grafted onto a rubber substrate having a glass transition temperature below 0° C., wherein the weight percentage of the rubber is in the range from 5 to 80 percent and the weight percentage of the copolymer is in the range of 95 to 20 percent of the graft rubber composition;

(B) 85 to 30 weight percent of a polyamide resin;

(C) 0.5 to 40 weight percent of a copolymer compatibilizer comprising styrene, acrylonitrile and a copolymerized functionalized monomer capable of reaction with the polyamide resin, wherein the concentration of functional groups of the copolymer compatibilizer is in the range of 0.1 to 10 weight percent; and (D) 0.5 to 20 weight percent of a core/shell grafted elastomer having an acid functionalized shell.

The percentage weights of components A, B, C and D are based on the total weight of components A, B, C and D in the blend.

DETAILED DESCRIPTION

Component A is referred to as a vinylaromatic/acrylonitrile grafted rubber type polymer, that is to say a rubber substrate grafted with styrene/acrylonitrile according to the foregoing description. The rubber substrate is preferably a diene rubber such as polybutadiene or a block or random copolymer of butadiene with a comonomer such as styrene or acrylonitrile, which rubber contains at least 50 percent and preferably at least 80 percent by weight of butadiene. Suitable block copolymers include linear block or radial-block copolymer rubbers. However, the rubber need not be a conventional polybutadiene or butadiene/styrene copolymer since any rubber with a glass transition temperature below 0° C. can be used. The glass transition temperature is measured by differential thermal analysis by heating a rubber sample under nitrogen at a rate of 10° C. per minute. Other rubbers such as EPDM rubber, polyisoprene, polyurethane, polychloroprene, polyacrylate rubbers and the like can, if desired, also be used. Preferably polyacrylate rubbers contain a minor amount of up to 5 weight percent of an interpolymerized monomer such as allyl acrylate to provide unsaturation and enhance grafting thereto.

Component A is preferably prepared by emulsion polymerizing the monomers of the elastomer core and thereafter grafting a hard phase of a copolymer of styrene and acrylonitrile monomer. Prior to grafting, the elastomer core may be agglomerated to form rubber particles having a bimodal particle size distribution if desired using agglomeration technology that is well known to the skilled artisan.

Vinylaromatic monomers used for the graft copolymer of component A include styrene, and substituted styrenes such as alpha-methylstyrene, chlorostyrene, bromostyrene, p-methyl styrene, and vinyl toluene. A preferred vinylaromatic monomer is styrene. The grafted hard phase may optionally include additional monomers such as methylmethacrylate or N-phenylmaleimide in amounts up to about 10 percent by total graft monomer weight if desired. Advantageously, graft polymerization conditions are selected to provide a graft efficiency of at least 20 weight percent and preferably at least 40 weight percent of the total graft and matrix polymer present in the graft rubber composition. Typically the vinylaromatic/acrylonitrile grafted rubber component contains from 30 to 80 weight percent rubber. The particle size of the vinylaromatic/acrylonitrile grafted rubber is advantageously in the range of 0.05 to 2.0 microns, preferably 0.1 to 0.5 microns. The amount of component A present in the blends of the present invention is preferably from 10 to 50 weight percent.

In addition to component A, other rubbery polymers may optionally be included in the polymeric composition of the invention. Such additional rubbery polymers are preferably selected from the group consisting of grafted elastomers similar to those of component A excepting that the grafted phase is different. Highly preferred are methylmethacrylate or styrene/methylmethacrylate copolymer grafted rubbers wherein the weight ratio of styrene/methylmethacrylate in the graft phase is from 90/10 to 10/90. A most preferred elastomer phase comprises polybutadiene or rubbery butadiene/styrene copolymers.

Component B is a polyamide such as nylon 6 or poly(caprolactam), nylon 11 or poly(11-aminoundecanoic acid), nylon 12 or poly(lauryl lactam) or poly(12-aminododecanoic acid), nylon 6,6 or poly(hexamethylene adipamide), nylon 6,9 or poly(hexamethylene azelamide) or poly(hexamethylene nonandiamide), nylon 6, 10 or poly(hexamethylene sebacamide) or poly(hexamethylene decanediamide), nylon 6, 12 or poly(hexamethylene dodecanodiamide) or nylon 4 or poly($\gamma$-butyrolactam), nylon 7 or poly(7-aminoheptanoic acid) or poly(7-aminooenanthylic acid), nylon 8 or poly(8-aminocaprylic acid) or poly(8-aminooctanoic acid), nylon 10,6 or poly(decamethylene adipamide) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—$(CH_2)_4$—OOH] residues in nylon 6,6 by those from mixtures of about 30–60 percent terephthalic acid (TA, or p—HOOC—$C_6H_4$—COOH/70–40 percent isophthalic acid (IA, or m—HOOC—$C_6H_4$—COOH) gives suitable PARNs which are high-melting, partly crystalline nylons 6, TA-co-6, IA or poly(hexamethylene tere-co-isophthalamides). Other suitable PARNs are partly crystalline nylons 6,6-co-6,-TA, nylons 6,6-co-6,IA, nylons 6,6-co-6,-TA-co-6,IA, and other similar PARNs, including partly crystalline PARNs wherein some of the diamine residues have aromatic character and those containing lactam residues, such as nylons 6-co-6,6-co-6,TA. The weight average molecular weight of the polyamide is advantageously greater than 10,000 and is preferably greater than 20,000.

Also suitable are various types of copolyamides, block copolymers, and graft copolymers. The preferred polyamide resins are nylon 6, and random copolymers of nylon 6,6 and nylon 6. It is not preferred to employ nylon 6,6 alone. The amount of component B present in the blends of the present invention is preferably from 80 to 40 weight percent.

In the generally accepted sense, two polymers are miscible when they form a single phase, solid solution. Miscibility of a blend of polymers may be confirmed by a single Tg for the polyblend, measured by calorimetry or dynamic mechanical analysis, or by optical clarity of the polyblend. When two polymers exhibit different Tgs or loss tangent peaks, they demonstrate immiscibility by forming two phases in a blend, each of which retains the Tg or loss tangent peak of one of the pure components. Partially miscible blends exhibit shifted or broadened loss tangent peaks relative to the individual pure components. When two polymers are compatible, a mixture provides a stable blend possessing a useful balance of mechanical properties exhibited by impact strength or tensile elongation to fail equal or superior to such properties for the component which provides the continuous phase in the mixture. By contrast, when two polymers are incompatible, the mixture generally exhibits mechanical properties, especially impact strength or tensile elongation to fail, which are lower than for the component which provides the continuous phase in the mixture. Incompatibility may be manifested during processing, for example, during molding and extrusion, by extensive phase separation, resulting in layering of the polymers and delamination under mild stress.

The present invention yields blends of polyamides, the vinylaromatic/acrylonitrile grafted rubber and component C that form compatible mixtures, i.e., stable mixtures comprising a micro dispersion of a minor amount of component A or B in a continuous phase of a major amount of the other component and results in polymer blends of generally improved balance of mechanical properties especially toughness demonstrated by higher notched impact strength. Such compatible blends are obtained by the use of the C component which acts as a compatibilizing polymer or "compatibilizer". In addition component D operates to further modify the notch sensitivity of the polyamide component giving improved toughness.

In the present invention, the structure of the C component compatibilizer is such that it meets several criteria:

1. The compatibilizer is at least partially miscible and preferably fully miscible with the vinylaromatic/acrylonitrile graft of component A.

2. The compatibilizer contains functional groups capable of reacting with the amine or acid end groups of the polyamide. An example is the anhydride-amine reaction that occurs when maleic anhydride is present as a copolymerized portion of the compatibilizer molecule and reacts with the terminal amine group in the polyamide molecule upon processing of the polymer blend.

3. The amount of reactive functionality in the compatibilizer is small and does not adversely affect the chemical and physical properties of the blend.

Component C is typically a copolymer comprising acrylonitrile and a vinylaromatic monomer of the type which is the same as is copolymerized in the vinylaromatic/acrylonitrile graft copolymer of component A. The weight ratio of vinylaromatic monomer/acrylonitrile is preferably from 90/10 to 70/30 and most preferable is the same ratio as in the graft copolymer portion of component A. Optionally there may be copolymerized up to 60 weight percent of a comonomer selected from the group consisting of $C_1$ to $C_4$ alkyl methacrylates, N-phenyl substituted maleimide, and mixtures of these monomers. Advantageously component C has a weight average molecular weight of at least about 10,000 and preferably at least about 50,000. The molecular weight is measured by gel permeation chromatography. While in principle the molecular weight can be extremely high, it is advantageous to have a weight average molecular weight less than 300,000 to provide ease of processing and blending with the other components of the polyblend and preferably less than 250,000.

Component C preferably contains from 0.5 to about 8.0 weight percent of a copolymerized comonomer containing a functional group which reacts with the amine or carboxylic acid groups of the polyamide. More preferably component C contains from about 0.75 to about 7.5 weight percent of such comonomer. The vinylaromatic polymer may be functionalized by polymerizing the vinylaromatic monomer with monomers containing a carboxylic acid such as acrylic or methacrylic acid or $C_1$ to $C_{12}$ monoalkyl esters of diacids such as monomethyl maleate and monododecyl fumarate, a dicarboxylic acid such as fumaric acid, maleic acid, itaconic acid, aconitic acid or citraconic acid, an anhydride, such as maleic, itaconic, aconitic or citraconic anhydride, or with an epoxide such as glycidyl acrylate, glycidyl methacrylate or allyl glycidyl ether or other monomers containing similar functional groups. A preferred functionalizing comonomer is maleic anhydride. The preferred component C is a copolymer consisting of styrene, acrylonitrile and maleic anhydride.

The preferred amount of component C in the polyblend is in the range of 1.0 to 20, more preferably 2 to 15 weight percent.

Component (D) comprises an additional rubbery material that is a core-shell grafted elastomer having an acid functionalized shell. Certain of these rubbers having a hard copolymer shell are disclosed in U.S. Pat. No. 4,086,300, the teachings of which are incorporated herein by reference. Suitable core/shell rubbers additionally include rubbery shell, grafted elastomers similar to those disclosed in the foregoing U.S. Pat. No. 4,086,300 but having a soft graft phase, i.e., a shell having a Tg less than 20° C. Particularly preferred examples of Component D are butadiene or styrene/butadiene rubbery core polymers with a shell of ethylacrylate/(meth)acrylic acid containing up to 10 percent acid in the shell.

In addition to the above components the polyblends of the invention can advantageously contain other additives such as plasticizers, antioxidants, stabilizers, flame retardants, fibers, roving, mineral fillers, dyes, pigments and the like.

The components of the polyblend can be blended together by any convenient process. Usually, however, they are extrusion blended or compounded in a high intensity blender such as a Banbury Mixer.

The invention is now described with reference to the following examples which are for the purposes of illustration only and are not intended to imply any limitation on the scope of the invention. The components described below are blended in a number of different ratios and tested for various properties. Parts and percentages are based on weight.

COMPONENTS USED

SAN-GRC—An emulsion polymerized, agglomerated and grafted elastomer, having a bimodal particle size prepared by polymerizing a core of butadiene/styrene rubber (92/8), agglomerating using a polymeric agglomerating agent followed by a graft polymerization of styrene/acrylonitrile (72/28). The latex is coagulated and dried. Total rubber content was 47 percent.

Core/Shell Rubber—Rubber of the core/shell type containing 80 percent butadiene/styrene copolymer rubber core (92/8, 0.12μ) and 20 percent of a rubbery grafted shell of ethylacrylate/methacrylic acid (92/8).

Nylon 6—Nycoa ® 525 available from Nylon Corporation of America.

S/AN/MA—Terpolymer of styrene/acrylonitrile/maleic anhydride (71/28/1).

TEST RESULTS

Compositions containing the above components in the amounts described in Table 1 are prepared by melt compounding the dry components in a 0.8 inch (20 mm) twin screw extruder and injection molding the resulting pellets. The resulting molded test specimens were tested "dry as molded" using ASTM testing procedures. Results are contained in Table 1.

TABLE 1

| Run | Composition (%) | Notched Izod[1] | | Melt Flow Rate[2] |
| | | 73° F. (23° C.) | −20° F. (−29° C.) | |
| --- | --- | --- | --- | --- |
| * | 31 SAN-GRC 64 Nylon 6 5 S/AN/MA | 20 | 1.9 | 6.8 |
| 1 | 26 SAN-GRC 5 Core/Shell Rubber 59 Nylon 6 10 S/AN/MA | 22 | 6 | 2.0 |

[1] ASTM 256 ft-lbs/inch notch (Joules/meter)
[2] ASTM D-1238, condition "G" gr/10 min As may be seen by comparison of the above results, the blend containing the core shell rubber component was surprisingly improved in low temperature notched Izod impact resistance compared to the similar blend lacking in such component.

What is claimed is:

1. A composition comprising a blend of components:
   (a) 5 to 60 weight percent of a graft rubber composition consisting essentially of 5 to 80 weight percent of a rubber having a glass transition temperature below 0° C. and 95 to 20 weight percent of a copolymer consisting essentially of from 90 to 70 parts by weight of a vinyl aromatic monomer and from 10 to 30 parts by weight of acrylonitrile, said vinyl aromatic and acrylonitrile monomers having been polymerized in the presence of and grafted onto the rubber;
   (b) 85 to 30 weight percent of a polyamide resin;
   (c) 0.5 to 40 weight percent of a copolymer compatibilizer consisting essentially of styrene, acrylonitrile, and a copolymerized functionalized monomer capable of reaction with the polyamide resin, wherein the concentration of functional groups of the copolymer compatibilizer is in the range of 0.1 to 10 weight percent; and
   (d) 0.5 to 20 weight percent of a core/shell grafted elastomer having an acid functionalized shell,
said weight percentages being based on the total weight of components (a), (b), (c), and (d) in the blend.

2. A composition according to claim 1 wherein components A, B, C and D are present in amounts from 10 to 50, 80 to 40, 1 to 20, and 1 to 10 weight percent respectively.

3. A composition according to claim 1 wherein component A comprises from 30 to 80 weight percent rubber and a graft efficiency of at least 20 percent.

4. A composition according to claim 1 wherein component A is a styrene/acrylonitrile grafted polybutadiene or butadiene/styrene elastomer.

5. A composition according to claim 1 wherein component B comprises Nylon 6.

6. A composition according to claim 1 wherein component C comprises styrene, acrylonitrile and maleic anhydride.

7. A composition according to claim 6 wherein the content of maleic anhydride in component C is from 0.5 to 8.0 percent.

8. A composition according to claim 1 wherein the core of the core/shell grafted elastomer comprises polybutadiene or styrene/butadiene copolymer.

9. A composition according to claim 1 wherein the shell of the core/shell grafted elastomer comprises a copolymer of ethylacrylate and (meth)acrylic acid.

* * * * *